(12) United States Patent
Jannard et al.

(10) Patent No.: US 6,966,647 B2
(45) Date of Patent: Nov. 22, 2005

(54) TELECOMMUNICATIONS ENABLED EYEGLASS

(75) Inventors: James H. Jannard, Eastsound, WA (US); Jeffrey J. Julian, Burbank, CA (US)

(73) Assignee: Oakley, Inc., Foothill Ranch, CA (US)

( * ) Notice: Subject to any disclaimer, the term of this patent is extended or adjusted under 35 U.S.C. 154(b) by 0 days.

(21) Appl. No.: 10/004,543

(22) Filed: Dec. 4, 2001

(65) Prior Publication Data

US 2002/0039170 A1 Apr. 4, 2002

Related U.S. Application Data

(63) Continuation of application No. 09/585,593, filed on Jun. 2, 2000, now Pat. No. 6,325,507.

(51) Int. Cl.[7] .............................................. G02C 1/00
(52) U.S. Cl. ........................................ 351/158; 351/41
(58) Field of Search ................................ 351/156, 155, 351/157, 158, 41; 2/452; 704/225, 270, 200; 445/351, 350; 381/187, 183

(56) References Cited

U.S. PATENT DOCUMENTS

| | | |
|---|---|---|
| 1,026,272 A | 5/1912 | Leveque |
| 1,370,806 A | 3/1921 | Garner |
| D130,310 S | 11/1941 | Monjar |
| 2,504,524 A | 4/1950 | Hayward |
| 2,688,900 A | 9/1954 | Silverman |
| 3,371,979 A | 3/1968 | Catanzaro |
| D228,677 S | 10/1973 | Wichers |
| D229,974 S | 1/1974 | Wichers et al. |
| 4,006,974 A | 2/1977 | Resnick |
| 4,149,780 A | 4/1979 | Young |
| 4,537,612 A | 8/1985 | Borrelli et al. |
| 4,550,984 A | 11/1985 | Reymond |
| 4,636,048 A | 1/1987 | Jones |
| 4,683,587 A | 7/1987 | Silverman |
| D292,986 S | 12/1987 | Magestro |
| 4,803,487 A | 2/1989 | Willard et al. |
| 4,806,011 A | 2/1989 | Bettinger |
| 4,856,086 A | 8/1989 | McCullough |
| 4,882,769 A | 11/1989 | Gallimore |
| 4,902,120 A | 2/1990 | Weyer |
| 4,904,078 A | 2/1990 | Gorike |
| 5,020,150 A | 5/1991 | Shannon |
| D325,590 S | 4/1992 | Galy |
| 5,137,342 A | 8/1992 | Jannard et al. |
| 5,249,001 A | 9/1993 | Jannard |
| 5,335,285 A | 8/1994 | Gluz |
| 5,353,378 A | 10/1994 | Hoffman et al. |
| 5,367,345 A | 11/1994 | da Silva |
| 5,406,340 A | 4/1995 | Hoff |

(Continued)

OTHER PUBLICATIONS

Motorola Bluetooth Wireless Headset User Guide.

(Continued)

*Primary Examiner*—Hung Xuan Dang
(74) *Attorney, Agent, or Firm*—Knobbe, Martens, Olson & Bear, LLP

(57) ABSTRACT

Disclosed is an eyewear retention system, which extends across the top of the wearer's head for supporting at least one lens in the wearer's field of view. The retention system includes at least a first and a second support component, which are spaced apart laterally from each other along at least a portion of the eyewear system. The system may include any of a variety of electronics, including telecommunications receivers, transmitters, electronic storage devices, and head-up display driving circuitry.

19 Claims, 5 Drawing Sheets

U.S. PATENT DOCUMENTS

| | | | |
|---|---|---|---|
| 5,481,763 | A | 1/1996 | Brostom et al. |
| 5,579,400 | A | 11/1996 | Ballein |
| 5,581,492 | A | 12/1996 | Janik |
| 5,606,743 | A | 2/1997 | Vogt et al. |
| 5,617,477 | A | 4/1997 | Boyden |
| 5,658,502 | A | 8/1997 | Hughes |
| 5,715,323 | A | 2/1998 | Walker |
| 5,717,479 | A | 2/1998 | Rickards |
| 5,721,783 | A | 2/1998 | Anderson |
| D392,990 | S | 3/1998 | Hall et al. |
| 5,760,868 | A | 6/1998 | Jannard et al. |
| 5,805,261 | A | 9/1998 | Houston et al. |
| 5,835,185 | A | 11/1998 | Kallman et al. |
| 5,892,564 | A | 4/1999 | Rahn |
| 5,953,434 | A | 9/1999 | Boyden |
| 6,091,546 | A | 7/2000 | Spitzer |
| 6,091,832 | A | 7/2000 | Shurman et al. |
| 6,106,116 | A | 8/2000 | Houston et al. |
| 6,108,197 | A | 8/2000 | Janik |
| 6,157,533 | A | 12/2000 | Sallam et al. |
| 6,181,956 | B1 | 1/2001 | Koskan |
| 6,211,799 | B1 | 4/2001 | Post et al. |
| 6,212,414 | B1 | 4/2001 | Alameh et al. |
| 6,239,778 | B1 | 5/2001 | Palffy-Muhoray et al. |
| 6,280,838 | B1 | 8/2001 | Bernards et al. |
| 6,285,757 | B1 | 9/2001 | Carroll et al. |
| 6,301,367 | B1 | 10/2001 | Boyden et al. |
| 6,301,593 | B1 | 10/2001 | Toyosato |
| 6,311,155 | B1 * | 10/2001 | Vaudrey et al. ............ 704/225 |
| 6,312,811 | B1 | 11/2001 | Frigoli et al. |
| 6,314,091 | B1 | 11/2001 | LaRowe, Jr. et al. |
| 6,325,507 | B1 * | 12/2001 | Jannard et al. ............ 351/156 |
| 6,347,095 | B1 | 2/2002 | Tang et al. |
| 6,349,001 | B1 | 2/2002 | Spitzer |
| 6,350,129 | B1 | 2/2002 | Gorlick |
| 6,351,468 | B1 | 2/2002 | LaRowe, Jr. et al. |
| 6,560,449 | B1 | 5/2003 | Liu |
| 2002/0159023 | A1 | 10/2002 | Swab |
| 2002/0176330 | A1 | 11/2002 | Ramonowski et al. |
| 2002/0197961 | A1 | 12/2002 | Warren |
| 2003/0067585 | A1 | 4/2003 | Miller et al. |
| 2003/0068057 | A1 | 4/2003 | Miller et al. |
| 2003/0073460 | A1 | 4/2003 | Van Pelt et al. |

OTHER PUBLICATIONS

Motorola Consumer catalog for Phone Accessories from "www.commerce.motorola.com", web site visited on Jun. 13, 2002.

Hands-Free Profile (HFP).

Headset Profile from Bluetooth Specification Version 1.1, Feb. 22, 2001, pp. 198-224.

How Bluetooth Works from "www.howstuffworks.com", web site visited on Jun. 11, 2002.

Special Product Review "ID Magazine", Aug. 2002, p. 179.

* cited by examiner

TELECOMMUNICATIONS ENABLED EYEGLASS

This application is a continuation of U.S. application Ser. No. 09/585,593 filed Jun. 2, 2000, now U.S. Pat. No. 6,325,507 entitled Eyewear Retention System Extending Across the Top of a Wearer's Head.

BACKGROUND OF THE INVENTION

1. Field of the Invention

The present invention relates generally to an over the head retention system which avoids contact with the lateral sides of the head while retaining eyewear in the wearer's field of view, and/or which provides a platform for supporting any of a variety of portable electronic devices.

2. Description of the Related Art

A wide variety of improvements have been made in recent years in the eyewear field, particularly with respect to eyewear intended for use in active sports or as fashion sunglasses. For example, certain improvements have been incorporated into eyewear having a unitary lens, such as the Blades® design, (Oakley, Inc.) the M Frame® line, (Oakley, Inc.), and the Zero® line, also produced by Oakley, Inc. These eyewear designs accomplish a variety of functional advantages, such as maximizing interception of peripheral light, reducing optical distortion and increasing the wearer's comfort level, compared to previous active sport eyewear.

Lens geometry has also been the subject of a variety of innovations. The unitary lens of the Blades® eyewear incorporates the cylindrical geometry disclosed, for example, in U.S. Pat. No. 4,859,048, issued to Jannard. This geometry allows the lens to closely conform to the wearer's face and intercept light, wind, dust, etc. from directly in front of the wearer (anterior direction) and peripherally (lateral direction). See also U.S. Pat. No. 4,867,550 to Jannard (toroidal lens geometry).

More precise control over prismatic shift induced by rake (or pantoscopic tilt) and wrap and other optical objectives in dual lens eyeglass systems has been achieved through the technology disclosed, for example, in U.S. Pat Nos. 5,648,832; 5,689,323; 5,969,789; and 6,010,218, all to Houston, et. al.

A variety of improvements in eyewear retention systems have also been made in recent years. See, for example, U.S. Pat. No. 5,137,342 to Jannard et al. (tubular traction device for dual earstem system); U.S. Pat. No. 5,249,001 to Jannard (earstem and frame adapted to provide a medially directed bias throughout a variety of head widths); U.S. Pat. No. 5,760,868 to Jannard, et. al (unitary hingeless eyeglass frame) and U.S. Pat. No. 5,805,261 to Houston, et al (biased eyeglass frames).

All of the foregoing retention system improvements relate generally to dual earstem designs, in which earstems or temples extend posteriorly along the sides of the wearer's head to achieve eyeglass retention. Notwithstanding these improvements, the need remains for new approaches to eyewear retention which would eliminate lateral pressure on the temples and yet provide comfortable eyewear retention.

In addition, there remains a need for a retention system which is capable of supporting and distributing the weight from loads attached to the retention system, such as eyeglass lenses, telecommunications systems, heads-up display electronics, and any of a variety of other audio and/or visual electronics components.

SUMMARY OF THE INVENTION

In accordance with one aspect of the present invention, there is provided an eyewear retention system. The system comprises an eyewear support, having an elongate arcuate frame. The frame comprises a frontal end and an occipital end, dimensioned to extend across the top of the head of a wearer from the wearer's face to the posterior of the head such as in the vicinity of the external occipital protuberance. The support includes a first component and a second component which are linked together in the frontal region and spaced apart in between the frontal region and the occipital region.

At least a portion of the first and second components are spaced laterally apart by a distance within the range of from about ½ inch to about 6 inches. Preferably, at least a portion of the first and second components are separated laterally by a distance within the range of from about 1.5 inches to about 3.0 inches. In some embodiments, the maximum separation between the first and second components is within the range of from about 2 inches to about 3 inches, preferably at a location along the top of the head.

Preferably, at least one lens is provided at the frontal end of the frame. Alternatively, two lenses are provided. The frontal end of the support may be directly connected to the lenses or lens orbitals, or is connected to the bridge on a frame including a right and a left orbital.

The frame has an arc length from the frontal end to the occipital end which is sufficient to extend from the lens or orbital to the vicinity of the external occipital protuberance of an average human wearer of a desired market segment (e.g. adult male, adult female, child, Asian, European, etc.). The arc length from the frontal end to the occipital end is generally within the range of from about 8 inches to about 18 inches, and, in most adult embodiments, within the range of from about 14 inches to about 16 inches.

Preferably, the first and second components are connected together at or anteriorly to the occipital end. The occipital end of the frame may be further provided with a housing having electronics therein. Contemplated electronics include digital or other storage devices, receivers, transmitters, heads-up display driving circuitry, power supplies and related components.

In one embodiment, the frame further comprises a nose pad for resting on the nose of a wearer. The nose pad may be integrally formed with the orbitals, or may be attached as a separately formed nosepiece.

Generally, the arcuate frame extends posteriorly from the frontal end throughout an arc of greater than about 180°. A reference point may be identified on the inside surface of the frame at the greatest linear distance from a central point on the nose pad. The frame preferably extends along an arc of at least about 2 inches beyond the reference point to the occipital end. Generally, the frame extends along an arc having a length within the range of from about 2 inches to about 6 inches beyond the reference point.

A linear distance between the midpoint on the nose pad and the occipital end of the frame, when the frame is in an unstressed configuration, is preferably at least about 3 inches. Generally, the linear distance between the midpoint on the nose pad and the occipital end of the frame is within the range of from about 5 inches to about 8 inches. The occipital end of the frame is preferably positioned within the range of from about 1.5 inches to about 3.5 inches anteriorly of a posterior tangent through the reference point.

In accordance with another aspect of the present invention, there is provided a method of stabilizing at least one lens in the wearer's field of view. The method comprises the steps of providing an eyeglass, having an arcuate frame for extending posteriorly across the top of the head of a wearer. The frame is placed on the head of the wearer, and stabilized by placing a first and a second supports spaced laterally apart along at least a portion of the top of the wearer's head.

Preferably, the first and second supports are separated laterally by a distance within the range of from about ½ inch to about 6 inches. The width of each of the first and second supports is within the range of from about 0.002 inches to about three inches.

Further features and advantages of the present invention will become apparent to those of ordinary skill in the art in view of the detailed description of preferred embodiments which follows, when considered together with the attached drawings and claims.

DETAILED DESCRIPTION OF THE PREFERRED EMBODIMENT

Figure 1:
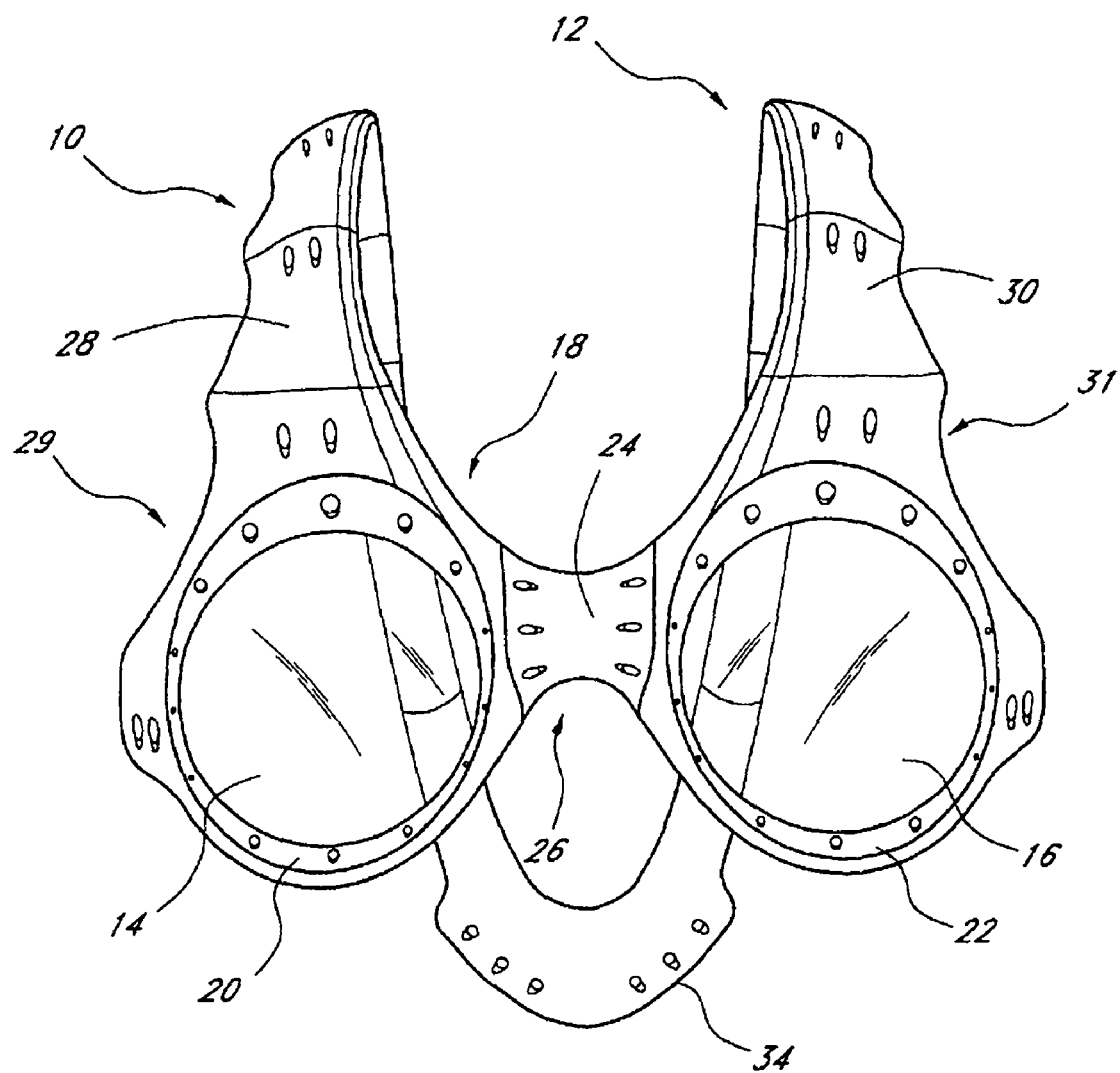
FIG. 1 is a front elevational schematic view of one embodiment of an eyewear retention system in accordance with the present invention.

Referring to FIG. 1, there is illustrated a front elevational view of one embodiment of an eyewear 10 including the support system 12 in accordance with the present invention. Although the eyewear retention system of the present invention will be described below primarily in the context of dual lens eyeglasses such as sunglasses or water white lenses, the present invention is broadly applicable to a wide variety of alternative eyewear, including unitary lens eyewear, protective glasses or eyeshields, electronic heads-up displays, or others as will be apparent to those of skill in the art in view of the disclosure herein.

The support system 12 is adapted to support any of a variety of portable electronic circuitry or devices which have previously been difficult to incorporate into conventional eyewear retention systems due to bulk, weight or other considerations. The over-the-head configuration of the frame 12 of the present invention allows distribution of load across the wearer's head, as well as positioning of relatively bulky or heavy electronics along the length of (e.g., inside) the support system 12 or at the posterior aspect of the support system 12 such as at the occipital end 34. This enables the eyewear retention system 10 to carry electronic equipment in a streamlined fashion, out of the wearer's field of view, and in a manner which distributes the weight across the head of the wearer such that the eyewear tends not to shift under the load, and uncomfortable pressure is not placed upon the wearer's nose, ears or temple regions.

Among the electronics contemplated by the present inventor are digital or other storage devices and retrieval circuitry such as for retrieving music or other information from MP3 format memory or other memory devices. Alternatively, any of a variety of receivers and/or transmitters such as for music, telecommunications and global positioning may also be carried by the support system 12. Drivers and other electronics for driving heads-up displays, such as liquid crystal displays or other miniature display technology may also be carried by the support 12. Replaceable or rechargeable power supplies and other electronics or mechanical components may additionally be carried by the support system 12.

The support system 12 of the present invention may also be utilized solely to support any of the foregoing or other electronics components or systems, without also supporting one or more lenses in the wearer's field of view. Thus, in any of the embodiments of the support system 12 disclosed herein, the lenses and/or lens orbitals may be omitted as will be apparent to those of skill in the art in view of the disclosure herein.

The eyewear 10 illustrated in FIG. 1 comprises a support 12 in the form an elongate arcuate frame having a frontal end for positioning at the front of the wearer's head and an occipital or posterior end for positioning on the posterior side of the wearer's head. The support 12 in one embodiment extends throughout an arc dimensioned to extend across the top of the head of the wearer generally from the glabellar region above the nose to the external occipital protuberance at the posterior of the head.

The arc length of the support 12 from the frontal end to the occipital end is normally within the range of from about 8 inches to about 18 inches, and commonly within the range of from about 14 inches to about 16 inches for most human adult heads. The specific dimensions disclosed herein are for reference purposes, and any of a variety of other specific dimensions may be selected as a particular commercial product is optimized to suit a desired population. For example, different size products may be produced corresponding to average dimensions for the adult male, adult female, and various children's or adolescent sizes. In addition, adult male and female dimensions may differ for various Asian, European and other market populations as will be apparent to those of skill in the art.

The support 12 preferably comprises a first support component 28 and a second support component 30 configured to extend across the top of the wearer's head to the occipital end 34. Generally, the posterior ends of the first and second support components 28 and 30 join at or about the occipital end 34, which may engage the external occipital protuberance. The anterior ends 29, 31 of the first support component 28 and second support component 30 are either connected directly together or connected together through a portion of the eyeglass as will be discussed below.

In general, the first and second support components 28 and 30 desirably have a sufficient resilience or memory that they may be hingeably or elastically deformed to fit onto the head of the wearer and retain a bias in the direction of their original configuration to provide secure attachment to the head. Further aspects of the functional requirements of the support 12 will be described below.

At least the head contacting surface of the first and second support components 28 and 30 are separated laterally from each other along at least a portion of the arc length of the support 12, to impart lateral stability to the eyewear 10. The lateral separation between the first support component 28 and second support component 30 is at least at some point within the range of from about ½ inch to about 6 inches, and, preferably, the lateral separation is within the range of from about 1.5 inches to about 4 inches. In some embodiments, the separation is between about 2 inches and about 3 inches at at least some point along the top of the head.

The width of each of the first support component 28 and second support component 30 may be varied considerably, depending upon the intended load to be carried by the support 12 as well as aesthetic issues. For example, in a wire frame embodiment of the present invention adapted to carry relative light loads (e.g., only light weight or no electronic components), each of the first and second supports 28 and 30 may be formed from wire or ribbon, having a width in the range of from about 0.020 inches to about 0.25 inches or greater. Molded or extruded polymeric components may have a width in the range of from about 0.125 inches to about 4 inches or greater. Preferably, a molded or extruded first or second support component 28 or 30 has a width within the range of from about 0.25 inches to about 1.5 inches and, preferably, from about 0.25 inches to about 0.75 inches unless a greater width is desired to enclose electronic components along the support 12.

Figure 3:
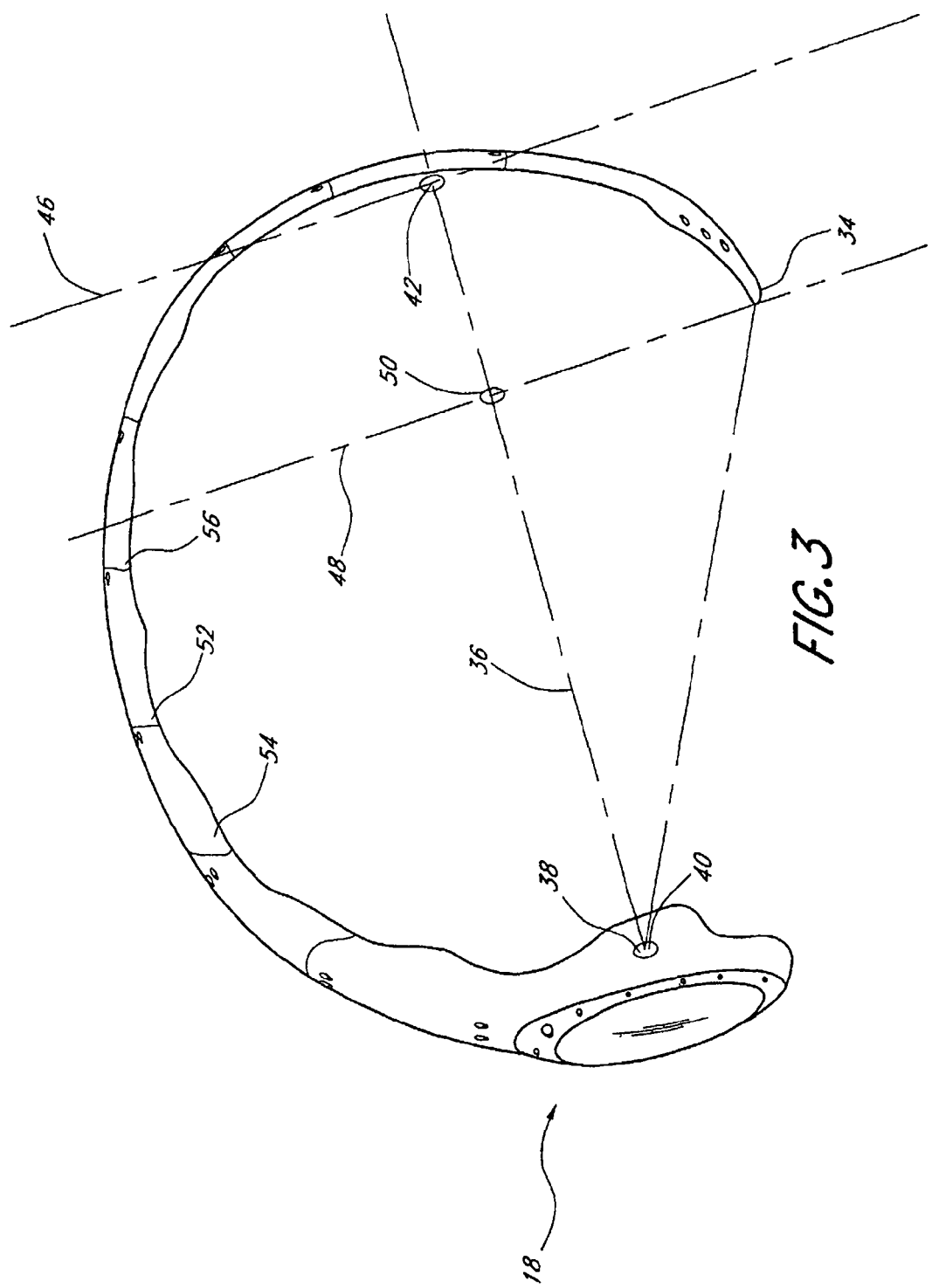
FIG. 3 is a side elevational view of the eyewear retention system of FIG. 1.

In the embodiment illustrated in FIG. 3, the first and second support components 28 and 30 extend generally parallel to each other from the anterior to the posterior of the wearer's head. The first and second support components 28 and 30 may also be inclined relative to each other, either such that they incline medially in a posterior direction such that the separation is greater at the anterior end than the posterior end, or inclined laterally in a posterior direction such that they have a greater separation at the posterior end than the anterior end. This later configuration may be useful in an embodiment in which the support 12 is connected at a medial portion of the eyeglass frame, such as at the bridge 24. See FIG. 4.

The length of the separation between the first and second support components 28 and 30 in the illustrated embodiment extends all the way from the anterior to the posterior or the head. This length may be shortened considerably from anterior to posterior. The front to back length of the separation will generally be in excess of about 20% of the overall front to back dimension of the eyewear, and, preferably, in excess of about 50% of the overall front to back dimension of the eyewear to optimize the stability feature of the present invention. The position of the greatest separation is preferably on the top of the wearer's head, preferably centered midway between the front and back or slightly anterior to the midpoint between the front and back of the eyewear.

Figure 4:
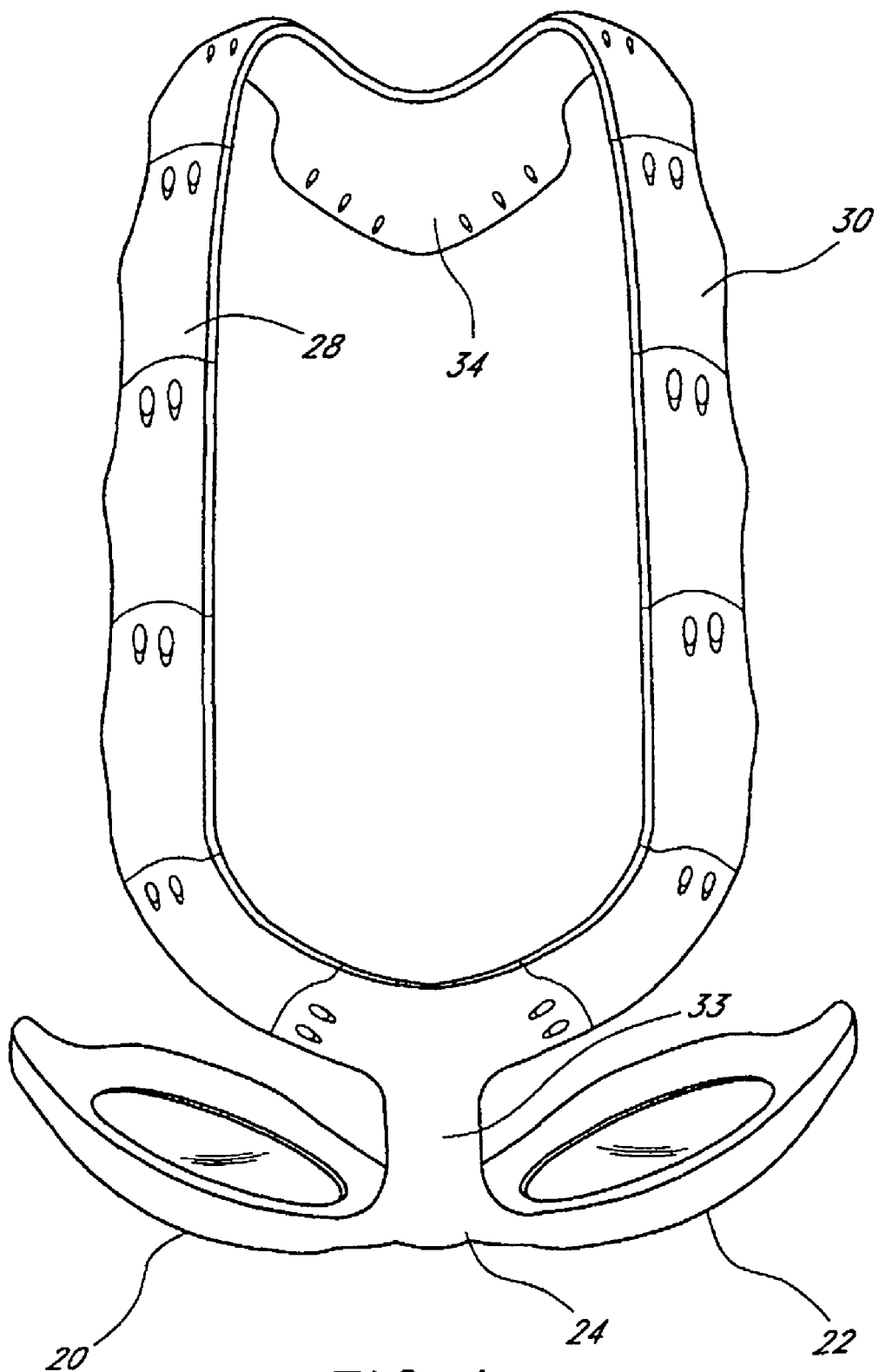
FIG. 4 is a top plan view as in FIG. 2, showing an alternative configuration.
Figure 5:
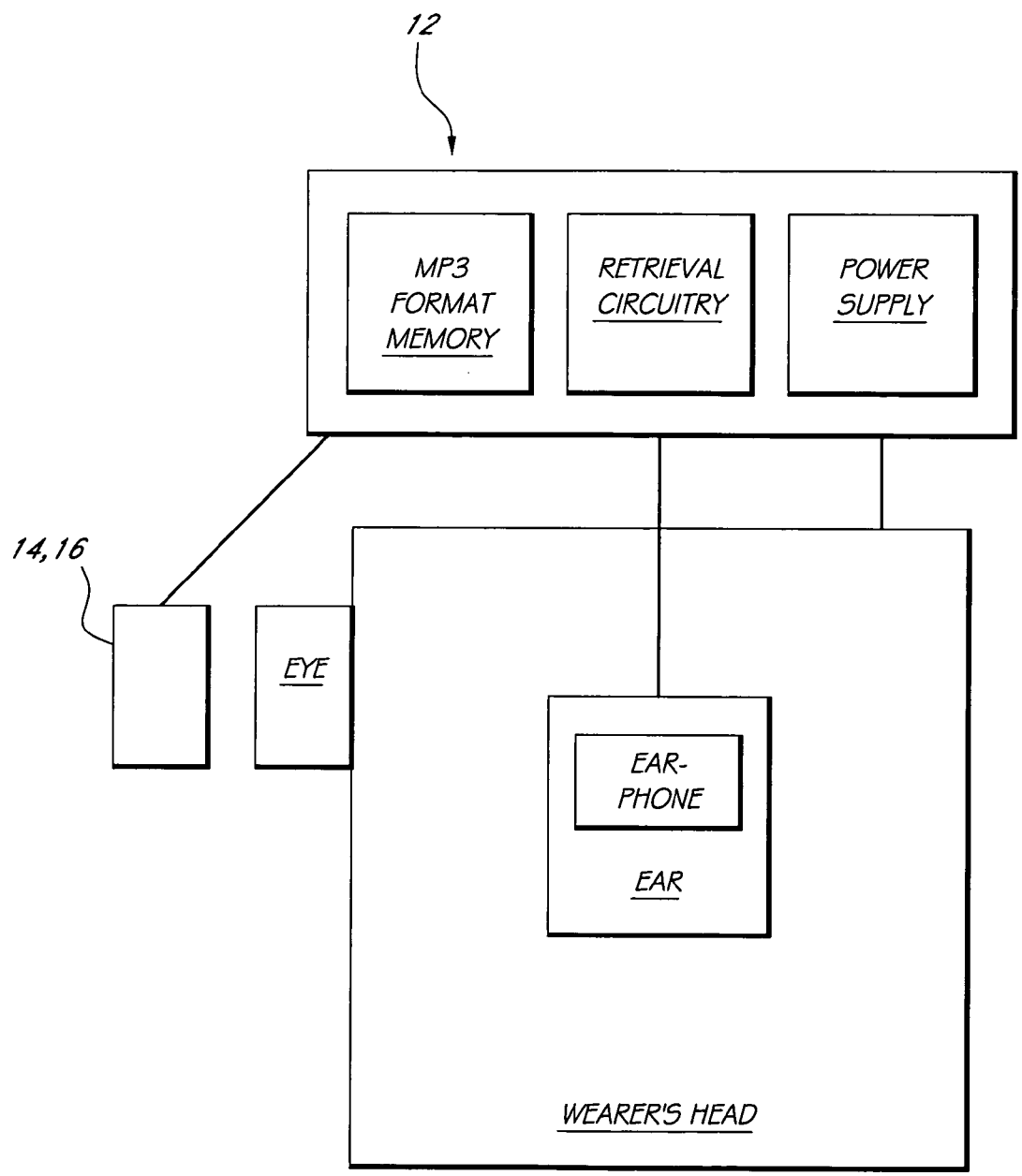
FIG. 5 is a schematic illustration of the eyewear retention system of FIGS. 1–4, including electronic components.

In one embodiment, illustrated in FIG. 4, the first and second support components 28 and 30 are joined together at about the top of the wearer's forehead and a single extension 33 extends downward across the wearer's forehead for connection to the bridge region 24 of a frame 18. Any of a variety of other configurations can be devised, which achieve the load distribution and balance of the present invention.

The eyewear 10 preferably supports at least one lens in the wearer's field of view. In the illustrated embodiment, the support 12 carries a first lens 14 and a second lens 16. First lens 14 is supported in a first orbital 20, and second lens 16 is supported in a second orbital 22. In the illustrated embodiment, the first and second orbitals 20 and 22 are connected by a bridge 24, which together make up a frame 18. Bridge 24 cooperates with first and second orbitals 20 and 22 to define a nose opening 26. Nose opening 26 may be provided with integrally formed nose pads, or a removable nosepiece or pads as will be apparent to those of skill in the art in view of the disclosure herein.

Figure 2:
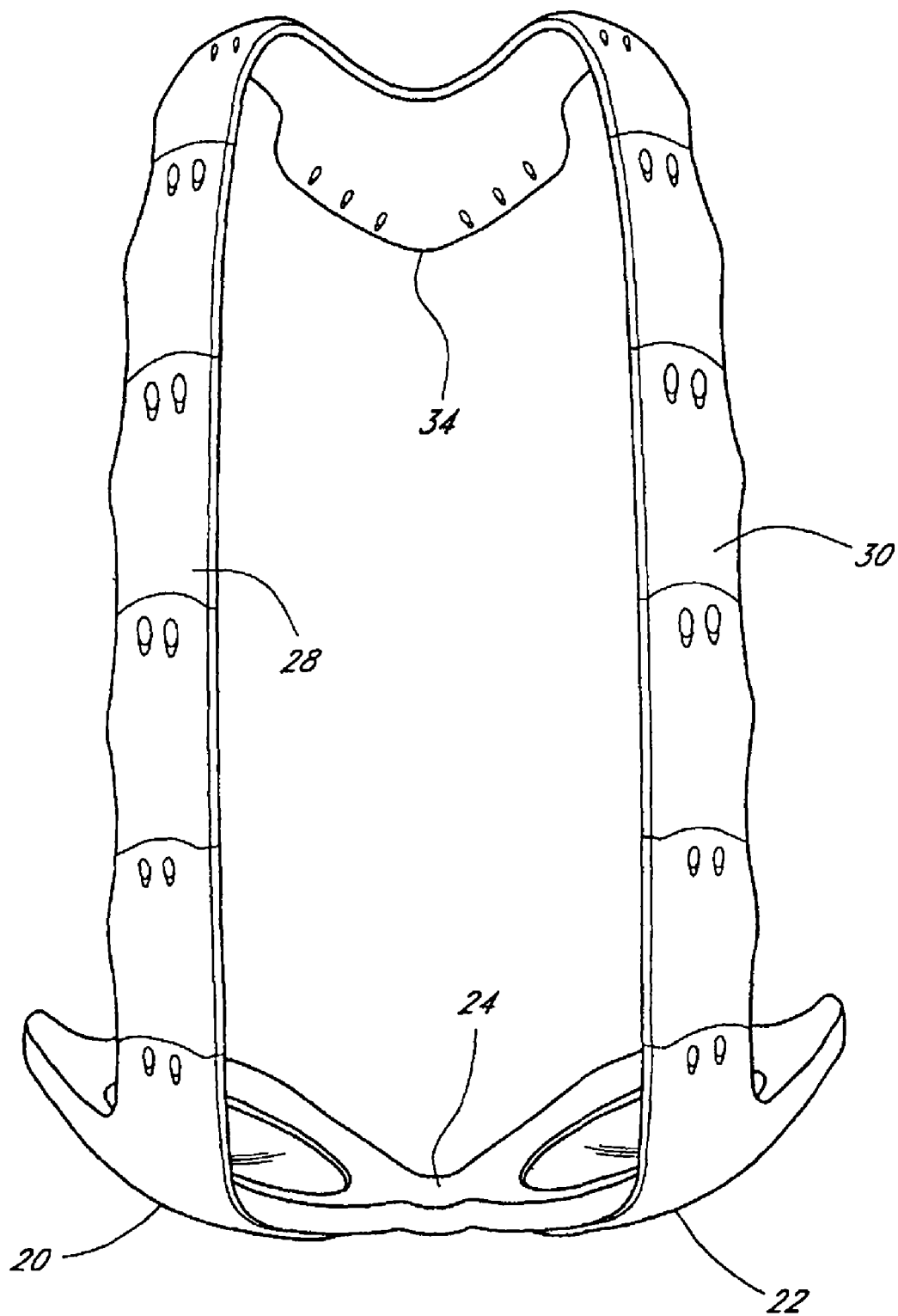
FIG. 2 is a top plan view of the eyewear retention system of FIG. 1.

The support 12 may be connected to the frame 18 in any of a variety of ways. In the illustrated embodiment, the first component 28 is connected to the first orbital 20 and the second support component 30 is connected to the second orbital 22. See FIGS. 1 and 2. Alternatively, the first and second support components 28 and 30 may be connected to the bridge 24. In another embodiment, the first and second support components 28 and 30 merge together into a single element 33 which extends across at least a portion of the glabellar region and forehead before connection to the bridge 24 or other portion of frame 18. See FIG. 4.

Referring to FIG. 3, there is illustrated a side elevational view of the eyewear 10 of FIG. 1. As seen therein, the first and second support components 28 and 30 are concave inferiorly and anteriorly (as worn) throughout an elongate arc adapted to engage the external occipital protuberance at the occipital end 34, and extend across the top of the wearer's head to support the frame 18 in front of the wearer's field of view. A horizontal reference line 36 is illustrated as extending between a first contact point 38 on the mechanical center of a nose pad 40, and a second contact point 42 on the interior surface of the support 12 at the greatest linear distance from the first contact point 38. Although the reference line 36 is termed "horizontal" for convenience, it bears no necessary relationship to true horizontal.

The relaxed linear distance between the first contact point 38 and second contact point 42 is generally within the range of from about 5 inches or less for a small size or highly elastic embodiment to about 8 inches. In one embodiment, the linear distance between the first contact point 38 and the second contact point 42 is within the range of from about 7 inches to 7¾ inches.

A posterior tangent 46 is illustrated through the second contact point 42 at the inside surface of the support 12. An occipital tangent 48 extends in parallel to the posterior tangent 46, through the occipital end 34. Occipital tangent 48 forms an intersection 50 with the horizontal reference line 36.

Generally, the linear distance along horizontal reference line 36 between the occipital tangent 48 and posterior tangent 46 is greater than about 0.5 or 1 inch, and, preferably, within the range of from about 1½ inches to about 3 inches. In general, the distance between intersection 50 and second contact point 42 is determined by the desired arc length of the first and second support components 28 to allow the occipital end 34 to fit securely on the posterior aspect of the wearer's head. In one embodiment, the arc length is designed to be sufficient in an average male adult (as exemplified by the $50^{th}$ percentile male Alderson's head form) to position the occipital end 34 on the posterior and inferior aspect of the external occipital protuberance, to provide the desired retention as will be apparent in view of the disclosure herein.

The linear distance between the intersection 50 and the occipital end 34 is generally within the range of from about 1½ to about 4 inches, and preferably, within the range of from about 2½ inches to about 3½ inches.

The linear distance from the first contact point 38 to the occipital end 34 in the unstressed configuration is generally within the range of from about 3 inches to about 8 inches, and typically within the range of from about 5 inches to about 7 inches for a human adult. In general, the resting distance between first contact point 38 and occipital end 34 may be varied considerably, depending upon the range of motion of the occipital end 34 with respect to the frame 18, and the elasticity or memory of the support 12.

Preferably, the support 12 may be flexed throughout a wide range to accommodate a wide variety of head dimensions, and still retain a bias in the direction of its original configuration, to impart a retention bias on the wearer's head. The elasticity of the support 12 may be derived from the materials and cross-sectional thicknesses and design of the first and second components 28 and 30. Alternatively, the first and second support components 28 and 30 may be provided with one or more spring elements such as a resilient wire or ribbon extending therethrough, to increase the closing bias on the support 12. Any of a variety of spring materials may be positioned on or within the first and second components 28 and 30, such as spring steel, Nitinol, or others which may be selected through routine experimentation by those of skill in the art.

One or more biased hinges may also be provided along the length of the support 12, such as spring loaded hinges, to provide a radially inwardly directed bias on the occipital end 34 of the support 12. See, e.g., the biased hinges disclosed in U.S. Pat. No. 5,805,261 to Houston et al., the disclosure of which in incorporated in its entirety herein by reference, in which a compressible material is positioned between two adjacent components to bias the orientation of the two components.

The support 12 described above may be further modified to accommodate a variety of head dimensions by enabling an elongation of the support 12 along its arcuate length. For example, one or more joints 52 may be provided in which a first component 54 and a second component 56 may be moved towards each other or away from each other along the arc of the support 12. Telescoping joints may be accomplished in any of a variety of ways, such as by providing a projection on a first of two adjacent components which is slideably received within a corresponding aperture on the second of the two adjacent components. The wearer may adjust the relative position of two adjacent components of the support 12 to optimize the fit. The motion between two adjacent components such as 54 and 56 may be resisted such as by a friction fit, or by any of a variety of locking structures. In this manner, the actual arc length of the support 12 may be shortened or lengthened, to enable adjustment of the eyewear 10 so that the nose pad 40 is appropriately placed on the wearer's nose and the occipital end 34 is spaced sufficiently far along the arc of the support 12 to provide sufficient retention.

The eyewear 10 may be manufactured in accordance with any of a variety of techniques, which will be understood by those of skill in the art in view of the disclosure herein. For example, the first and second support components 28 and 30 may be injection molded into their final desired configuration. The orbitals 20 and 22 and bridge 24, where used, may be integrally molded with the first and second support components 28 and 30. Alternatively, the support 12 may be separately formed from the frame 18, and secured together as a secondary manufacturing step.

In an embodiment which includes electronic components, additional functional attachments may be provided as desired anywhere along the length of the frame, lenses or orbitals. For example, earphones may be directed towards the wearer's ear from one or two earphone supports extending rearwardly from the front of the eyeglass, down from the top of the support 12 or forwardly from the rear of the support 12. Similarly, one or more microphones may be directed at the wearer's mouth from one or two microphone supports connected to the orbitals or other portion of the frame.

Although the present invention has been described in terms of certain preferred embodiments, other embodiments will become apparent to those of skill in the art with reference to the disclosure contained herein. Accordingly, the scope of the present invention is intended not to be limited by the disclosed embodiments, but to be coextensive with the full scope of the attached claims.

What is claimed is:

1. An MP3 storage enabled eyeglass, comprising:
    an eyeglass frame, adapted to be carried by the head of a wearer;
    a first lens orbital, carried by the eyeglass frame for positioning a first lens in the path of the wearer's field of view;
    a second lens orbital, carried by the eyeglass frame for positioning a second lens in the path of the wearer's field of view;
    an MP3 format memory device carried inside of the eyeglass frame;
    a power supply, carried by the eyeglass frame;
    at least a first earphone support extending from the eyeglass frame;
    at least a first earphone, carried by the first earphone support, configured to direct the first earphone towards a first ear of the wearer; and
    retrieval circuitry configured to retrieve music from the MP3 format memory.

2. An MP3 storage enabled eyeglass as in claim 1, wherein the MP3 format memory and the retrieval circuitry are disposed in the eyeglass frame.

3. An MP3 storage enabled eyeglass as in claim 1, wherein the retrieval circuitry is configured to play music retrieved from the MP3 format storage through the first earphone.

4. An MP3 storage enabled eyeglass as in claim 1, wherein the eyeglass frame includes a nose bridge portion, the MP3 format memory, the retrieval circuitry, and the first earphone being disposed rearwardly from the nose bridge portion.

5. An MP3 storage enabled eyeglass as in claim 1, additionally comprising a power supply, wherein the eyeglass frame includes a nose bridge portion, the MP3 format memory, the first earphone, and the power supply being disposed rearwardly from the nose bridge portion so as to provide a better balanced distribution of weight over a wearer's head.

6. An MP3 storage enabled eyeglass as in claim 5, further comprising a second earphone carried by a second earphone support, the second earphone and the second earphone support being disposed rearwardly from the nose bridge portion.

7. An MP3 storage enabled eyeglass, comprising:
    an eyeglass frame, adapted to be carried by the head of a wearer;
    a first lens orbital, carried by the eyeglass frame for positioning a first lens in the path of the wearer's field of view;
    a second lens orbital, carried by the eyeglass frame for positioning a second lens in the path of the wearer's field of view;
    means for storing music in an MP3 format inside of the eyeglass frame;
    a power supply, carried by the eyeglass frame;
    at least a first earphone support extending from the eyeglass frame;
    at least a first earphone, carried by the first earphone support, configured to direct the first earphone towards a first ear of the wearer; and
    means for retrieving music from the means for storing.

8. An MP3 storage enabled eyeglass as in claim 7, further comprising means for evenly distributing a weight of the means for storing, means for retrieving, first earphone support, and first earphone over a wearer's head.

9. An MP3 storage enabled eyeglass as in claim 8, wherein the means for evenly distributing comprises means for distributing the weight of the means for storing, means for retrieving, first earphone support, and first earphone over a top of the wearer's head.

10. An MP3 storage enabled eyeglass, comprising:
    an eyeglass frame, adapted to be carried by the head of a wearer;
    a first lens support, carried by the eyeglass frame for positioning a first lens in the path of the wearer's field of view;
    a second lens support, carried by the eyeglass frame for positioning a second lens in the path of the wearer's field of view;
    an MP3 format memory device directly carried by the eyeglass frame;
    a power supply, carried by the eyeglass frame;
    at least a first earphone support extending from the eyeglass frame;
    at least a first earphone, carried by the first earphone support, configured to direct the first earphone towards a first ear of the wearer; and
    retrieval circuitry configured to retrieve music from the MP3 format memory.

11. An MP3 storage enabled eyeglass as in claim 10, wherein the frame further comprises first and second support members extending rearwardly from the first and second lens supports such that portions of each of the first and second support members are disposed above at least portions of a wearer's left and right ears when wearing the eyeglass, wherein the MP3 format memory device is supported directly by at least one of the first and second support members.

12. An MP3 storage enabled eyeglass as in claim 10, wherein the MP3 format memory and the retrieval circuitry are disposed in the eyeglass frame.

13. An MP3 storage enabled eyeglass as in claim 10, wherein the retrieval circuitry is configured to play music retrieved from the MP3 format storage through the first earphone.

14. An MP3 storage enabled eyeglass as in claim 10, wherein the eyeglass frame includes a nose bridge portion, the MP3 format memory, the retrieval circuitry, and the first earphone being disposed rearwardly from the nose bridge portion.

15. An MP3 storage enabled eyeglass as in claim 10, additionally comprising a power supply, wherein the eyeglass frame includes a nose bridge portion, the MP3 format memory, the first earphone, and the power supply being disposed rearwardly from the nose bridge portion so as to provide a better balanced distribution of weight over a wearer's head.

16. An MP3 storage enabled eyeglass as in claim 15, further comprising a second earphone carried by a second earphone support, the second earphone and the second earphone support being disposed rearwardly from the nose bridge portion.

17. An MP3 storage enabled eyeglass, comprising:
    an eyeglass frame, adapted to be carried by the head of a wearer;
    a first lens support, carried by the eyeglass frame for positioning a first lens in the path of the wearer's field of view;
    a second lens support, carried by the eyeglass frame for positioning a second lens in the path of the wearer's field of view;
    means for storing music in an MP3 format carried directly by the eyeglass frame;
    a power supply, carried by the eyeglass frame;
    at least a first earphone support extending from the eyeglass frame;
    at least a first earphone, carried by the first earphone support, configured to direct the first earphone towards a first ear of the wearer; and
    means for retrieving music from the means for storing.

18. An MP3 storage enabled eyeglass as in claim 17, further comprising means for evenly distributing a weight of the means for storing, means for retrieving, first earphone support, and first earphone over a wearer's head.

19. An MP3 storage enabled eyeglass as in claim 18, wherein the means for evenly distributing comprises means for distributing the weight of the means for storing, means for retrieving, first earphone support, and first earphone over a top of the wearer's head.

* * * * *